United States Patent Office.

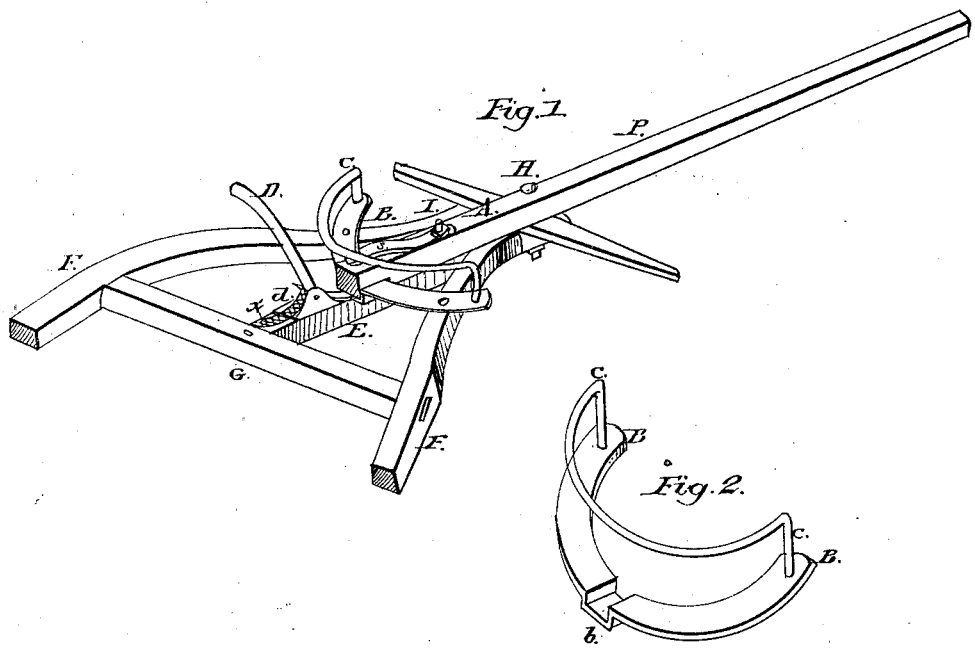

SAMUEL L. HEISEY, OF WEST DONEGAL, PENNSYLVANIA.

Letters Patent No. 67,430, dated August 6, 1867.

---

CULTIVATORS.

---

The Schedule referred to in these Letters Patent and making part of the same.

---

TO ALL WHOM IT MAY CONCERN:

Be it known that I, SAMUEL L. HEISEY, of West Donegal township, in the county of Lancaster, and State of Pennsylvania, have invented a new and improved mode for arranging the action of the pole, so as to facilitate turning Cultivators at the end of the furrows; and I do hereby declare that the following is a full and exact description thereof, reference being had to the accompanying drawings, making a part of this specification, in which—

Figure 1 is a perspective view of my improvement in place.

Figure 2 shows the circular sliding plate with its right-angled depression in the centre and its guide-rod over it, the draught of the horses being on the bolt that forms the pivot of the pole.

The nature of my invention consists in providing a means that will allow the horses to turn about one-fourth of a circle when the end of a furrow or field is reached without any strain on the shifting-pole, as is the case when a rigid pole is used, causing the horses to prance or otherwise manifest a restless action in turning, as all know to be the case in using the cultivators as now constructed.

To enable others skilled in the art to make and use my invention, I will proceed to describe its construction and operation.

Fig. 1 shows a portion of a machine, a central piece, E, framed into a cross-piece, G, and cheeks F. These parts support the sliding plate shown by (fig. 2) B, of a semicircular form, with a radius from the insertion of the bolt H, (fig. 1.) This plate is sunk in the centre at $b$, for the reception of the butt of the pole P. This plate has also a stout guide-rod, $c$, curved in like manner, raised sufficiently high on end standards, so as to admit a spring, S, between its lower side and the butt of the pole when raised out of the central socket or recess $b$ in B as to allow it to slide to and fro between the plate E and guide-rod $c$. This spring S has one end affixed by a bolt, I, or otherwise, on the top of the pole, extending under the guide-rod $c$. On the central piece E there is a plate, $d$, with a pair of lugs or perforated ears, for the pin or fulcrum of a lever, D, the lower end of which comes under the butt of the pole P in its recess $b$. There is also a spring, $x$, acting upon the lever D shown.

The operation is simply to raise the butt of the pole out of its notch when about to turn the team or horses to one side or the other. When partially turned the draught will bring the machine around, and when arrived in line with the return course the end of the pole will drop into the notch again by the action of the spring, and held in place. I also relieve the pole from the weight of the double-tree by resting it upon a plate beneath, attached to the under side of the centre piece E and cheeks F, and consequently this weight is not carried by the horses, as when placed upon the top of the pole, and answers better with the partial revolution of the pole or its bolt H aforesaid. This I do not claim as an invention, nor simply the circular plate B for the pole to slide on, but the combined arrangement.

From a personal experience of my arrangement, and its utility and great assistance in facilitating the turning of cultivators of various kinds, by easing the horses on being turned round short, and preventing that restless spirit manifested by most horses at this point of turning, satisfies me that it is a desirable improvement, and one, when tried, that cannot fail to prove satisfactory to others.

What I claim as my invention, and desire to secure by Letters Patent, is—

The arrangement of the sliding plate B, with its guide $c$, recess $b$, in combination with the lever D and springs S $x$, all arranged and operating substantially in the manner and for the purpose specified.

SAMUEL L. HEISEY

Witnesses:
 WM. B. WILEY,
 B. H. LEHMAN.